(12) United States Patent
Kasso et al.

(10) Patent No.: US 11,550,484 B2
(45) Date of Patent: Jan. 10, 2023

(54) TECHNIQUES FOR PERSISTING DATA ACROSS INSTANCES OF A CLOUD SHELL

(71) Applicant: Oracle International Corporation, Redwood Shores, CA (US)

(72) Inventors: Christopher S. Kasso, Los Altos, CA (US); Peter Grant Gavares, Austin, TX (US); Shih-Chang Chen, Mount Laurel, NJ (US); Devasena Kiruba Sagar, Burlington, NJ (US); Michael William Gilbode, Mount Laurel, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/714,794

(22) Filed: Apr. 6, 2022

(65) Prior Publication Data

US 2022/0236875 A1 Jul. 28, 2022

Related U.S. Application Data

(63) Continuation of application No. 17/078,835, filed on Oct. 23, 2020, now Pat. No. 11,327,673.

(51) Int. Cl.
*G06F 12/00* (2006.01)
*G06F 3/06* (2006.01)
*G06F 11/14* (2006.01)

(52) U.S. Cl.
CPC ............. *G06F 3/064* (2013.01); *G06F 3/067* (2013.01); *G06F 3/0619* (2013.01); *G06F 3/0631* (2013.01); *G06F 3/0644* (2013.01); *G06F 11/1451* (2013.01); *G06F 11/1464* (2013.01); *G06F 11/1469* (2013.01)

(58) Field of Classification Search
CPC ...... G06F 3/064; G06F 3/0619; G06F 3/0631; G06F 3/0644; G06F 3/067; G06F 11/1451; G06F 11/1464; G06F 11/1469
See application file for complete search history.

(56) References Cited

U.S. PATENT DOCUMENTS

| 8,307,072 B1 | 11/2012 | Melvin |
| 8,625,431 B2 | 1/2014 | Droux et al. |

(Continued)

OTHER PUBLICATIONS

U.S. Appl. No. 16/993,970, "Non-Final Office Action", dated Oct. 28, 2021, 7 pages.

(Continued)

*Primary Examiner* — John A Lane
(74) *Attorney, Agent, or Firm* — Kilpatrick Townsend & Stockton LLP

(57) ABSTRACT

Techniques for persisting user data across secure shell instances are provided. The techniques include a method wherein a computer system receives a request to reserve a block volume, the request being received from a session manager service. The method also includes reserving the block volume, identifying a data center identifier of the block volume, returning the data center identifier of the block volume to the session manager service, attaching the block volume to a volume management fleet machine, receiving an instruction from the session manager service to release the block volume, creating a backup of the block volume comprising the data stored in the block volume, and releasing the block volume.

20 Claims, 14 Drawing Sheets

(56) References Cited

U.S. PATENT DOCUMENTS

| | | |
|---|---|---|
| 8,819,362 B1 | 8/2014 | Duprey et al. |
| 8,954,574 B1 | 2/2015 | Chheda et al. |
| 9,345,054 B1 | 5/2016 | Lu |
| 9,935,788 B2 | 4/2018 | Fausak et al. |
| 9,973,567 B2 | 5/2018 | Chen et al. |
| 10,334,708 B2 | 6/2019 | Kim et al. |
| 10,397,273 B1 | 8/2019 | Stickle et al. |
| 10,462,056 B2 | 10/2019 | Zhu |
| 10,664,358 B1 | 5/2020 | Chen et al. |
| 10,819,958 B2 | 10/2020 | Kim et al. |
| 10,880,405 B2 | 12/2020 | Cooley et al. |
| 10,970,757 B2 | 4/2021 | Van Biljon et al. |
| 11,003,542 B1 | 5/2021 | Kucherov et al. |
| 11,038,710 B2 | 6/2021 | Chamarajnager et al. |
| 11,327,673 B1 | 5/2022 | Kasso et al. |
| 11,368,306 B2 | 6/2022 | Kasso et al. |
| 11,374,792 B2 | 6/2022 | Kasso et al. |
| 2006/0206300 A1 | 9/2006 | Garg et al. |
| 2008/0298588 A1 | 12/2008 | Shakkarwar |
| 2009/0313447 A1 | 12/2009 | Nguyen et al. |
| 2012/0005521 A1 | 1/2012 | Droux et al. |
| 2012/0079221 A1 | 3/2012 | Sivasubramanian et al. |
| 2012/0084261 A1 | 4/2012 | Parab |
| 2013/0124807 A1 | 5/2013 | Nielsen et al. |
| 2015/0301844 A1 | 10/2015 | Droux et al. |
| 2016/0119306 A1 | 4/2016 | Matthews et al. |
| 2017/0085558 A1 | 3/2017 | Ibrahim et al. |
| 2018/0234294 A1 | 8/2018 | Wadekar et al. |
| 2019/0097838 A1 | 3/2019 | Sahoo et al. |
| 2019/0303246 A1 | 10/2019 | Gokhale et al. |
| 2020/0259652 A1 | 8/2020 | Schmaltz, III et al. |
| 2020/0320199 A1 | 10/2020 | Sheth et al. |
| 2020/0364734 A1 | 11/2020 | Glazier et al. |
| 2020/0409599 A1* | 12/2020 | Liguori ................. G06F 3/0659 |

OTHER PUBLICATIONS

U.S. Appl. No. 16/993,970, "Notice of Allowance", dated Apr. 6, 2022, 6 pages.

U.S. Appl. No. 16/993,970, "Notice of Allowance", dated Dec. 24, 2021, 7 pages.

U.S. Appl. No. 16/993,973, "Non-Final Office Action", dated Aug. 2, 2021, 19 pages.

U.S. Appl. No. 16/993,973, "Notice of Allowance", dated Jan. 20, 2022, 12 pages.

U.S. Appl. No. 17/078,835, "Notice of Allowance", dated Mar. 1, 2022, 10 pages.

International Application No. PCT/US2021/045797, "International Search Report and Written Opinion", dated Nov. 24, 2021, 11 pages.

U.S. Appl. No. 16/993,973, "Notice of Allowance", dated May 10, 2022, 11 pages.

U.S. Appl. No. 17/668,802, "Non-Final Office Action", dated Jul. 27, 2022, 22 pages.

* cited by examiner

TECHNIQUES FOR PERSISTING DATA ACROSS INSTANCES OF A CLOUD SHELL

CROSS-REFERENCES TO RELATED APPLICATIONS

This application is a continuation of U.S. application Ser. No. 17/078,835, filed on Oct. 23, 2020, entitled "TECHNIQUES FOR PERSISTING DATA ACROSS INSTANCES OF A CLOUD SHELL," which is related to U.S. Non-Provisional application Ser. No. 16/993,973, filed on Aug. 14, 2020, entitled "TECHNIQUES FOR UTILIZING MULTIPLE NETWORK INTERFACES FOR A CLOUD SHELL," and U.S. Non-Provisional application Ser. No. 16/993,970, filed on Aug. 14, 2020, entitled "TECHNIQUES FOR USING SIGNED NONCES TO SECURE CLOUD SHELLS," the disclosures of which are incorporated by reference in their entirety for all purposes.

BACKGROUND OF THE INVENTION

Cloud-based platforms provide scalable and flexible computing resources for users. Such cloud-based platforms, also referred to as infrastructure as a service (IaaS), may offer entire suites of cloud solutions around a customer's data, for example, solutions for authoring transformations, loading data, and presenting the data. IaaS systems may implement data replication and backup to preserve user data.

BRIEF SUMMARY OF THE INVENTION

Techniques are provided (e.g., a method, a system, non-transitory computer-readable medium storing code or instructions executable by one or more processors) for persisting user data across secure shell instances, using restored block volumes and terminating instances between sessions.

In an embodiment, a method includes receiving, by a computer system, a request to reserve a block volume, the request being received from a session manager service. The method may include reserving, by the computer system, the block volume. The method may include identifying, by the computer system, a data center identifier of the block volume. The method may include returning, by the computer system, the data center identifier of the block volume to the session manager service. The method may include attaching, by the computer system, the block volume. The method may include receiving, by the computer system, an instruction from the session manager service to release the block volume. The method may include creating, by the computer system, a backup of the block volume comprising the data stored in the block volume. The method may also include releasing, by the computer system, the block volume.

In a variation, the request may include a user identifier, and wherein reserving the block volume comprises, determining whether a registered block volume is allocated to a user corresponding to the user identifier, and, in accordance with a registered block volume being allocated to the user, reserving the registered block volume, and in accordance with a registered block volume not being allocated to a user corresponding to the user identifier, reserving an empty volume from a pool of empty volumes, the empty volume being preformatted to dock with a secure cloud shell. The method may further include receiving a request to restore the block volume, the request received from the session manager service, creating a restore volume using the backup of the block volume, the restore volume comprising the data stored in the block volume, and returning a data center identifier of the restore volume to the session manager service. The backup of the block volume may further include an identifier of the backup, and wherein creating the restore volume may include reserving an empty block volume from a pool of empty volumes, the empty block volume being preformatted to dock with a secure cloud shell, retrieving the backup of the block volume using the identifier of the backup, provisioning the empty block volume at least in part by loading the backup of the block volume onto the empty block volume, and identifying the data center identifier of the empty block volume as the data center identifier of the restore volume. Creating the backup of the block volume may include creating a disk image of the block volume. Creating the backup of the block volume may include converting data of the block volume to object data and storing the object data in an object storage system.

In certain embodiments, a computer system includes one or more processors and a memory in communication with the one or more processors, the memory configured to store computer-executable instructions, wherein executing the computer-executable instructions causes the one or more processors to perform one or more of the steps of the method described above.

In certain embodiments, a computer-readable storage medium stores computer-executable instructions that, when executed, cause one or more processors of a computer system to perform one or more steps of the method described above.

DETAILED DESCRIPTION OF THE INVENTION

Figure 1:
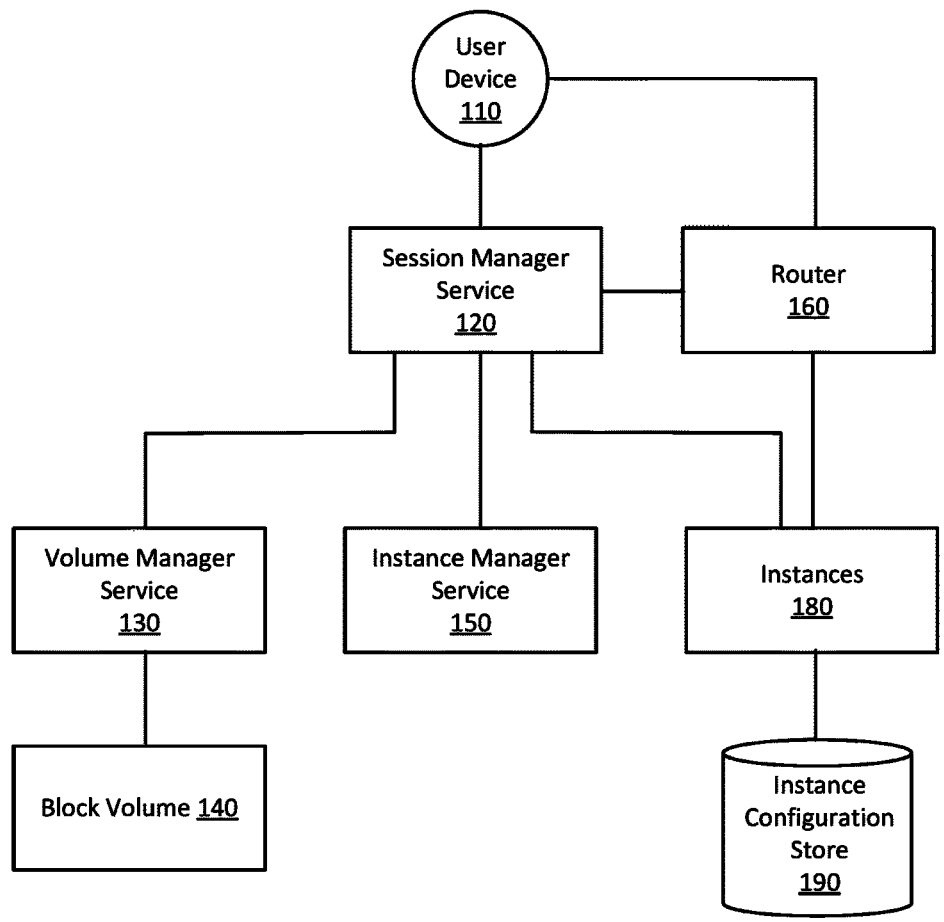
FIG. 1 illustrates an example system for managing secure shell instances, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Such cloud-based platforms, also referred to as infrastructure as a service (IaaS) may offer entire suites of cloud solutions around a customer's data, for example solutions for authoring transformations, loading data, and presenting the data. Users of IaaS resources may request to create a secure terminal in a secure shell instance, so that operations and data transfers may be carried out securely (e.g., with two-way encryption via a Web Socket secure (wss) connection).

In some embodiments, a shell instance can be a specialized compute instance that may run a docker container (e.g., a host) and may allow a user device to run terminals on that docker container. A user device may be assigned a single host, but may also create multiple active terminals on that host. A shell instance may be terminated after a period of inactivity. The instance may run the host, which may in turn run a secure shell (e.g., a terminal). In some embodiments, instances and/or hosts also may be terminated when no terminals have been active on the host for a period of time.

In some embodiments, an instance agent may run on an allocated instance and may handle receiving Web Socket traffic and sending that traffic to a secure shell running on the host. The instance agent may be an HTTP server that may be configured to open secure Web Socket connections and to redirect the input and output to a terminal (e.g., a secure shell running on a docker container) running on the instance. In some embodiments, the agent may identify an updated version of the docker container, may start the docker container, and may create the terminal in the container. In some embodiments, the agent may further specialize the docker container to contain secure shell configuration information and may execute the terminal in the docker container at least in part by passing in specific environmental variables.

In some embodiments, a volume manager service can persist user data from a terminated instance to a subsequently configured instance for the same user. The volume manager service may identify and attach a user block volume to a secure shell instance when it is available, and may generate a backup of the user data for the instance as part of terminate operations at the end of an instance lifetime. Backup operations may include retaining user data for a retention period, a backup in object storage, and/or a backup image (e.g., a volume image). The volume manager system may create backups prior to releasing the user block volumes. The volume manager service may communicate with a session manager service, which may query the instance agent to ascertain an idle time for the secure shell instance. The session manager service may request the volume manager service to release the user block volume after the idle time has exceeded a lifetime of the instance. In some cases, the session manager service may request the volume manager service to release the user block volume after a retention period has elapsed. The retention period may provide reduced latency when a user requests a new secure shell instance by re-attaching the user block volume without restoring user data from block storage to a newly configured block volume.

To restore the user block volume as part of creating a secure shell instance backup user data may be transferred from the object storage, or other backup storage format, as part of a restore process. For example, the volume manager service may reserve an empty block volume (e.g., at least partially pre-configured for attachment to a secure shell instance) and may request backup user data to be transferred by a backup service to provision the empty block volume. The volume manager service may return a unique identifier of the restored user block volume to the session manager service as part of configuring the secure shell instance, thereby persisting user data from a terminated instance to a new restored instance.

In some embodiments, the techniques described herein may be incorporated as computer-executable instructions in a software developer kit (SDK) that may be used by the web-based terminal to create and access these resources. In this way, the SDK could also be used by other providers to implement a secure web-based terminal. Additionally, the techniques described herein may permit a user device to connect to a secure shell running one or more terminals with improved security and latency. For example, by persisting user data automatically, rather than relying on manual instructions to configure a backup, the session manager may potentially improve inefficiency introduced by uneven system load, and overhead introduced by UI backup system requests and by maintaining user block volumes for periods of time between user connections to secure shell instances (e.g., when a user is not accessing the user data). Latency may be reduced in termination processes by automating block volume storage management, rather than relying on user initiated release. In this way, connection requests may encounter briefer wait-times for block volumes to be reserved during periods of high system demand and low storage availability in a given data center or IaaS region.

FIG. 1 illustrates an example system 100 for managing secure shell instances, in accordance with one or more embodiments. In some embodiments, the system 100 may permit a user to connect securely to a compute instance (e.g., a virtual machine (VM) or a docker). Secure access may permit a user to connect to a distributed computing system resource (e.g., Infrastructure as a Service (IaaS)) including, but not limited to, distributed storage, compute cores, etc., over an encrypted connection (e.g., https, and/or Web Socket Secure (wss)) for real-time data transfer with a VM of the IaaS system. In some embodiments, a user device 110 may generate a signed request for a secure shell instance, and may send the signed request to a session manager service 120. The session manager service 120 may perform operations as part of validating the user device 110 and configuring a secure shell instance as part of fulfilling the signed request.

In some embodiments, the user device 110 may generate the signed request using a user interface including, but not limited to a graphical user interface console, or a command line interface (CLI). The user interface include an identity authorization service, which may generate a user public/private key pair. In some cases, the user public/private key pair may be a temporary key pair generated, for example, at the initialization of a session, at the time of generating a request for a secure VM connection, etc. The user device 110 may generate the signed request using the private key of the user public/private key pair.

In some embodiments, the session manager service 120 may implement one or more authorization steps as part of managing and preparing a secure shell instance. The authorization may include receiving and validating the signed request, for example, by requesting the public key and using the key to validate the signature of the signed request (e.g., as a step of validating the identity of the user device 110).

In some embodiments, the session manager service 120 may fulfill the signed request at least in part by reserving and configuring a secure shell instance. In some cases, the session manager service 120 may communicate with a volume manager service 130 to reserve a block volume 140. The volume manager service 130 may return a domain identifier of the block volume 140 to the session manager service 120. In some embodiments, the domain identifier may describe one or more data centers within a geographic region (e.g., an availability domain (AD)) of the block volume 140 that has been reserved. As described in more detail in reference to the figures, below, the volume manager service 130 may facilitate one or more techniques for persisting user data across multiple secure shell sessions. For example, the techniques may include generating a user data backup in response to receiving a release request by the volume manager service 130, in some cases, before releasing the user block volume from the secure shell instance and terminating a secure shell session.

In some embodiments, the session manager service 120 may provide the domain identifier of the block volume 140 (e.g., the AD of the reserved block volume) to an instance manager service 150. The instance manager service 150 may allocate a compute instance in the AD provided by the volume manager service. The instance manager service 150 may provide instance identifier information (e.g., a cloud infrastructure ID) for the allocated instance to the session manager service 120. Allocation of a compute instance may be done on a per-user basis and/or on a per-compartment basis (where a compartment is a logical container that controls access to cloud system resources, and may include sub-compartments). For example, the session manager service 120 may allocate separate instances for a user in different compartments. In contrast, the session manager service 120 may allocate a single compute instance for multiple containers, such that separate containers share the same compute instance, one container per compartment (where a container is a packaged software application that may include application code, runtime, system tools, system libraries, and settings).

In some embodiments, the session manager service 120 may provide the instance identifier to the user device 110, along with a router address of a router 160. The router 160 may be configured to connect the user device to a secure shell instance, as described in more detail below (e.g., via a duplexing web socket connection). Furthermore, the router may also be configured to validate the user device 110 and the session manager service 120 as part of securely connecting the user device 110 to the secure shell instance.

In some embodiments, the session manager service 120 may generate a nonce token as a part of the authorization and validation of the user device 110 secure connection to a secure shell instance. In some embodiments, the nonce token may be a web token (e.g., a JavaScript Object Notation "json" web token (jwt token)) containing information including, but not limited to a header, a validity period (e.g., in minutes before expiration), a key, and/or a random string (e.g., an alphanumeric sequence of set length). In some cases, the nonce token is generated and provided to the user device 110 along with the instance identifier and the router address.

As part of configuring the secure shell instance, the session manager service 120 may select and configure an existing instance from a pool of available instances 180, as described in more detail in reference to the figures below. In some cases, the session manager service may install a configuration file and a delegation token in the selected instance. The configuration may include parameter information including, but not limited to, the instance identifier, the domain identifier, request details (e.g., resource allocations, compartment, tenancy), etc. The delegation token may be installed in the user's shell environment on the instance. The token may provide a proof that the user is authenticated and may allow the user to execute commands against their account without the need to re-authenticate. In some embodiments, an IaaS system may deny any CLI commands executed against a user account for which the delegation token is not installed in the user's shell environment.

In some embodiments, the configuration parameters installed by the session manager service 120 may be stored in an instance configuration store 190. The instance configuration store 190 may permit a new secure shell instance to be restored and/or reconfigured with request parameters following termination of the secure shell instance. In some embodiments, the secure shell instance will be terminated when the user has completed using it. In some embodiments, the session manager service 120 may instruct the instance manager service 150 to terminate the secure shell instance based on a period of inactivity (e.g., an idle time) of the agent and/or activity via the router 160. The idle time may be provided as part of the configuration parameters. In some embodiments, a user of the user device 110 may request the secure shell instance to be terminated, which may be implemented by the session manager service 120.

As described above, the example system 100 may provide improved security and stability of IaaS systems, at least by permitting a user device to connect to a secure shell instance from a console and/or command line interface. Persisting user data during instance restore operations, rather than maintaining a user block volume, may reduce the potential effects of breakout from a container by restoring data from a system service that holds the data without read-write access when not in use, rather than maintaining a block volume that could potentially be compromised.

The example system 100 may further improve security and performance of IaaS systems through implementing user data persistence techniques. For example, generating user data backups and generating a restore volume in response to receiving a restore request may reduce system resource usage associated with maintaining a user block volume. Instead, a backup may be stored in a low-overhead storage format (e.g., disk image, etc.) until the data is requested for a restored secure shell session. Similarly, maintaining user block volumes may present some level of risk if the system 100 is breached. Holding user data as a backup in long-term storage, for example, in a system that does not permit read-write operations, may reduce the risk of unauthorized access to user data between secure shell sessions.

Figure 2:
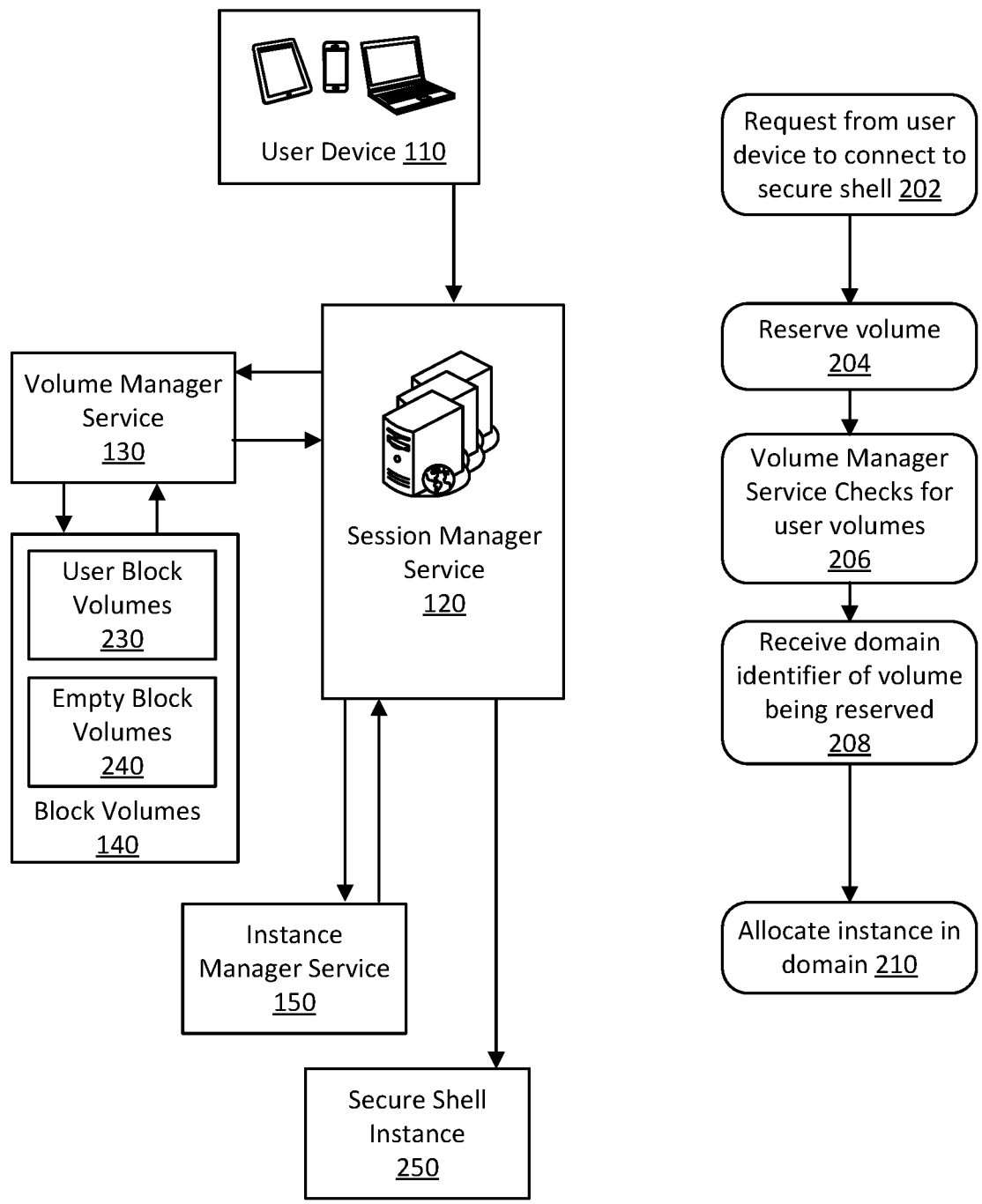
FIG. 2 illustrates an example technique for reserving a block volume for a secure shell instance, in accordance with one or more embodiments.

FIG. 2 illustrates an example technique 200 for reserving a block volume for a secure shell instance, in accordance with one or more embodiments. As part of reserving and configuring the shell instance, as described in more detail in reference to FIG. 1, above, the session manager service 120 may perform one or more operations in coordination with constituent services of the example system 100 of FIG. 1.

In some embodiments, the session manager service may receive a request from the user device to connect to a secure shell (e.g., operation 202), as described above in reference to authorizing and validating the user request. In response to receiving the user request, the session manager service 120 may reserve a volume in coordination with the volume manager service 130 (e.g., operation 204). Reserving the volume may involve steps including, but not limited to, ascertaining, by the volume manager service 130, whether one or more block volumes are already associated and/or assigned to the user (e.g., user block volumes 230) of the user device 110 and are available to host the secure shell instance 250 (e.g., operation 206). This may include checking a user identifier (e.g., a username or login ID) against a registry of block volumes managed by the volume manager service 130. Where a user block volume 230 is identified, domain identifier information (e.g., a resource ID, a datacenter infrastructure locator, etc.) may be returned to the session manager service 120 to indicate the volume has been reserved to host the secure shell instance 250 (e.g., operation 208).

The volume manager service 130 may find that a user block volume 230 is not available to attach to the secure shell instance 250. In some embodiments, the volume manager service 130 may reserve an empty block volume 240, which may include one or more of the block volumes 140 that are available at the given data center and/or IaaS region to which a user may not already be assigned. Similarly, the volume manager service 130 may provide resource identifier information for the session manager service 120 to implement in subsequent operations. For example, the session manager service 120 may allocate an instance in the block volume 140 returned by the volume manager service 130 (e.g., operation 210).

In some embodiments, allocating the instance may include providing the domain identifier to the instance manager service 150. As described in more detail in reference to FIG. 1, the instance manager service 150 may select and reserve an existing instance that is maintained as part of a number of available instances (e.g., instances 180 of FIG. 1) that may be at least partially pre-configured for use as secure shell instances. The instance manager service 150 may return an instance identifier (e.g., instance ID) to the session manager service 120, which may permit the session manager service 120 to identify the selected instance in subsequent operations. In some embodiments, selecting and reserving an existing instance, rather than creating and configuring an instance at the time of implementing the connection request, may potentially reduce system latency in processing the connection request.

Figure 3:
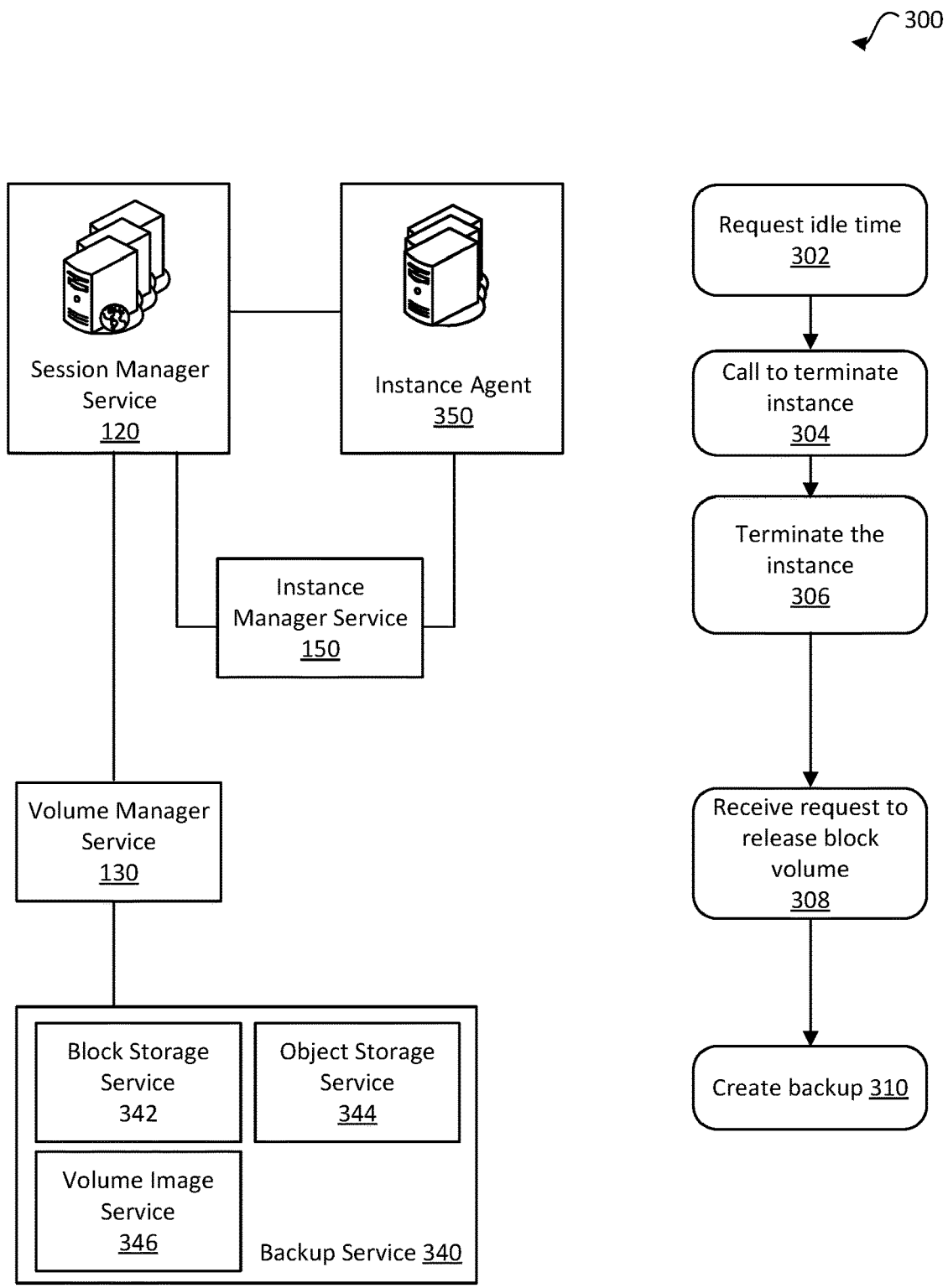
FIG. 3 illustrates an example technique for releasing a block volume including user data from a secure shell instance, in accordance with one or more embodiments.

FIG. 3 illustrates an example technique 300 for releasing a block volume including user data from a secure shell instance, in accordance with one or more embodiments. One or more sub-systems of the system 100 of FIG. 1 (e.g., the session manager service 120 the volume manager service 130, and the instance manager service 150) may perform operations associated with terminating and/or restoring a secure shell instance (e.g., secure shell instance 250 of FIG. 2). Ending a secure shell session, for example, when a user of a user device (e.g., user device 110 of FIG. 1) requests to disconnect from the secure shell instance, may include detaching the user block volume from the secure shell instance and one or more additional and/or alternative operations, as described below.

In some embodiments, the session manager service 120 requests an idle time from an instance agent 350 (e.g., operation 302). As described above, the instance agent 350 may be an HTTP server that may be configured to open secure Web Socket connections and to redirect the input and output to a terminal (e.g., a secure shell running on a docker container) running on the instance. In some embodiments, the agent may identify an updated version of the docker container, may start the docker container, and may create the terminal in the container. In some embodiments, the agent may further specialize the docker container to contain secure shell configuration information and may execute the terminal in the docker container at least in part by passing in specific environmental variables.

In some embodiments, the session manager service 120 may be configured to terminate the secure shell instance after a period of time has elapsed since the last connection that exceeds a threshold time and/or after a user request to disconnect or terminate the secure shell instance. In some embodiments, the session manager service 120 may send a request to the instance manager service 150 to terminate the secure shell instance after the idle time returned by the instance agent 350 exceeds a configured lifetime of the secure shell instance (e.g., operation 304). In response, the instance manager service 150 may implement additional operations to terminate the secure shell instance (e.g., in coordination with the instance agent 350).

As part of the termination operations, the volume manager service 130 may receive a request to release the block volume (e.g., operation 308). In some embodiments, the block volume (e.g., block volumes 140 of FIG. 1) may contain user data generated and/or stored during the secure shell session, which may be valuable to a user of the user device (e.g., user device 110 of FIG. 1). In this way, the volume manager service 130 may implement one or more operations to facilitate terminating the secure shell instance including, but not limited to, creating a backup of the block volume (e.g., operation 310).

In some embodiments, the volume manager service 130 may create the backup using a backup service 340. The backup service may include an external IaaS resource including, but not limited to, a block storage service 342, an object storage service 344, a volume image service 346, etc. In some embodiments, the volume manager service 130 may maintain the user block volume during a retention period, rather than creating a backup. The retention period may provide reduced latency when a user requests a new secure shell instance by re-attaching the user block volume without requesting a backup to be created, or by restoring user data from block storage to a newly configured block volume.

In some embodiments, the volume manager service 130 may create the backup using the object storage service 344, such that the backup is formatted for transfer to an object storage system. In contrast to block volume storage, object storage may potentially reduce IaaS system overhead, by permitting data to be stored as chunk objects in a data store, reducing the resources required to maintain a user block volume. In some embodiments, the object storage service 344 may permit the backup to store user data for lower cost in terms of system resources, albeit introducing additional data formatting conversion operations that may introduce latency into secure shell session restore processes.

In some embodiments, the volume manager service 130 may create the backup by creating a volume image (e.g., using volume image service 346). A volume image (e.g., a disk image of the block volume) may include, as a computer file, the contents and structure of the volume. The volume image may be created by generating a copy with a manifest of blocks preserving the structure of the original block volume. In some cases, the volume image may be compressed relative to the block volume, to potentially reduce the size of the image to that of the data stored in the block volume (e.g., omitting excess or unused reserved capacity in the block volume). The volume image may permit user data to be restored from a single file, rather than a restore procedure that includes provisioning multiple blocks and/or chunk objects. As such, it may permit system restore operations with potentially reduced latency as well as reduced resource demands, due at least in part to not maintaining a block volume for user data between secure shell sessions.

Figure 4:
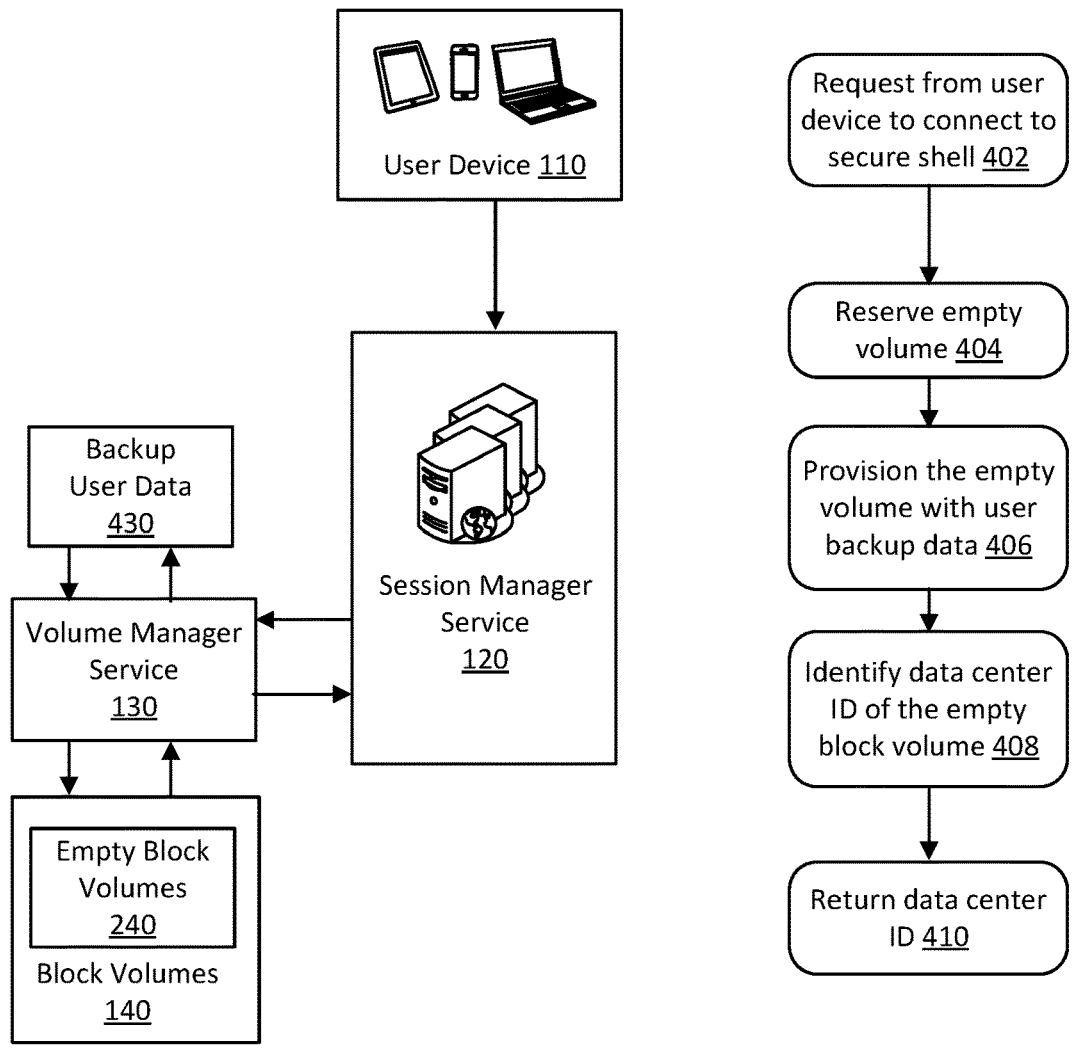
FIG. 4 illustrates an example technique for restoring a block volume for a restored secure shell instance, in accordance with one or more embodiments.

FIG. 4 illustrates an example technique 400 for restoring a block volume for a restored secure shell instance, in accordance with one or more embodiments. One or more sub-systems of the system 100 of FIG. 1 (e.g., the session manager service 120 the volume manager service 130, and the instance manager service 150) may perform operations associated with terminating and/or restoring a secure shell instance (e.g., secure shell instance 250 of FIG. 2). Restoring the secure shell instance may include creating a new secure shell instance with an empty block volume and provisioning the empty block volume with backup data (also referred to as "hydrating" the empty block volume).

In some embodiments, the session manager service 120 may receive a request from the user device 110 to connect to a secure shell instance, as described in more detail in reference to FIG. 1, above (e.g., operation 402). In a restore operation of the technique 400, the user request may include a request to reconnect to a secure shell instance after the session manager service 120 has requested a termination operation (e.g., technique 300 of FIG. 3), rather than an initial configuration and/or connection to a secure shell instance.

In some embodiments, the session manager service 120 may request for the volume manager service to reserve a block volume 140 to attach to the secure shell instance, as described in more detail in reference to FIG. 2, above. Instead of searching for a user block volume, as described previously, the volume manager service 130 may reserve an empty block volume 240 (e.g., operation 404). The empty block volume 240 may be preconfigured for attaching to a secure shell instance, for example, as part of a pool of block volumes.

The volume manager service 130 may provision the empty block volume 240 with backup user data 430 (e.g., operation 406). As described in more detail in reference to FIG. 2, the backup user data 430 may be stored in a number of different data formats including, but not limited to block storage and object storage, for example, as a disk image (e.g., as a single file) or distributed into multiple data subunits (e.g., blocks, objects, etc.). In some embodiments, the volume manager service 130 may request that the reserved empty block volume be provisioned with the backup user data 430 using a backup service (e.g., backup service 340 of FIG. 3). In some embodiments, the backup service may facilitate the transfer of the backup user data 430 (e.g., blocks) over a distributed storage system (e.g., a cloud storage system). In some embodiments, provisioning the empty block volume 240 may include reformatting the backup user data 430 into block data from object data (e.g., in cases where the backup is stored as object data), as described in more detail in reference to FIG. 3, above.

In some embodiments, the volume manager service 130 may identify a data center (e.g., AD) identifier of the empty block volume for which the backup user data 430 is provisioned (e.g., operation 408). Identifying the data center identifier may include ascertaining a hardware address of the empty block volume 240 in IaaS infrastructure (e.g., a data center) that may identify systems where the backup user data 430 is stored. Once identified, the volume manager service 130 may return the data center identifier to the session manager service 120 (e.g., operation 410). The session manager service 120 may use the data center identifier to provide to the instance manager service (e.g., instance manager service 150 of FIG. 1), as part of configuring and creating a secure shell instance, as described in more detail in reference to FIGS. 1-2, above.

Figure 5:
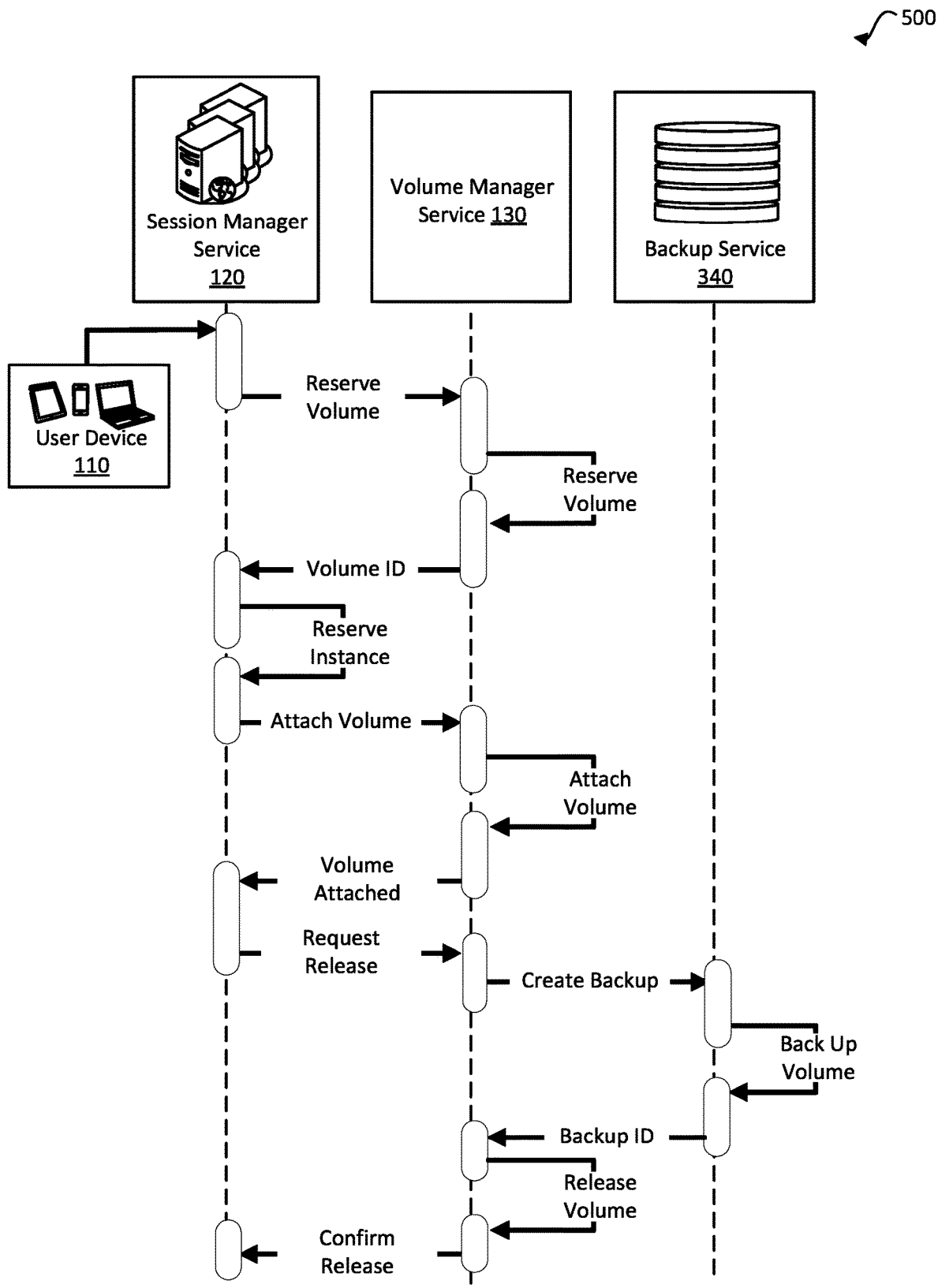
FIG. 5 illustrates a sequence diagram showing an example data flow by which a block volume including user data is released, in accordance with one or more embodiments.

FIG. 5 illustrates a sequence diagram showing an example data flow 500 by which a block volume including user data is released, in accordance with one or more embodiments. A user of the user device 110 requests to connect to a secure shell instance and the session manager service 120 requests the volume manager service to reserve a volume. After the session manager service 120 determines to terminate the secure shell instance, it requests the volume manager service 130 to release the block volume.

In data flow 500, the user device 110 (which may be an example of user device 110 of FIG. 1) may submit a request to connect to a secure shell instance. as described in more detail in reference to FIGS. 1-2, which may be received by the session manager service 120. Upon receiving the request, the session manager service 120 may configure a shell instance, as described in more detail in reference to the figures above. Configuring a shell instance may include multiple operations including, but not limited to reserving a volume, allocating an instance from a number of available instances that are created for the purpose of configuring a secure shell instance, and installing a configuration file on the allocated instance.

Reserving the volume may include one or more operations including requesting for the volume manager service 130 to reserve a block volume, as described in more detail in reference to FIG. 2 and FIG. 4. For example, reserving a block volume may include searching existing block volumes for a user block volume (e.g., user block volumes 230 of FIG. 2) containing user data, and returning the data center identifier of the user block volume to the session manager service 120. In some cases, as when a user block volume is not found by the volume manager service 130, the volume manager service may identify and return a data center identifier (e.g., AD identifier) of a reserved block volume (e.g., an empty block volume 240 of FIG. 2).

Configuring the shell instance may include receiving, by the session manager service 120, a shell instance identifier from an instance manager service (e.g., an IaaS resource identifier). As described in more detail in reference to FIGS. 1-2, the instance may be reserved from a pool of instances at least partially pre-configured, to which the reserved volume may be attached. Attaching the reserved volume may include one or more operations, for example, requesting for the volume manager service 130 to attach the volume. In response to a request by the session manager service 120, the volume manager service 130 may attach the volume, and return a confirmation to the session manager service 120.

When the session manager service 120 determines that the secure shell instance is idle and/or the user of the user device 110 requests to terminate the secure shell instance, the session manager service 120 may request the volume manager service 130 to release the block volume, as described in more detail in reference to FIG. 3. As part of releasing the block volume, the volume manager service may create a backup of the user data contained in the block volume. The volume manager service may receive, as part of the backup operation, a backup identifier from a backup service 340. In some embodiments, the backup operation may be performed by the backup service, as described in more detail in reference to FIG. 3.

Releasing the block volume may include removing the user data from the block volume (e.g., reformatting) to return the storage capacity to availability for future configuration of block volumes. As part of releasing the block volume, the volume manager service 130 may confirm that the block volume has been released to the session manager service 120.

Figure 6:
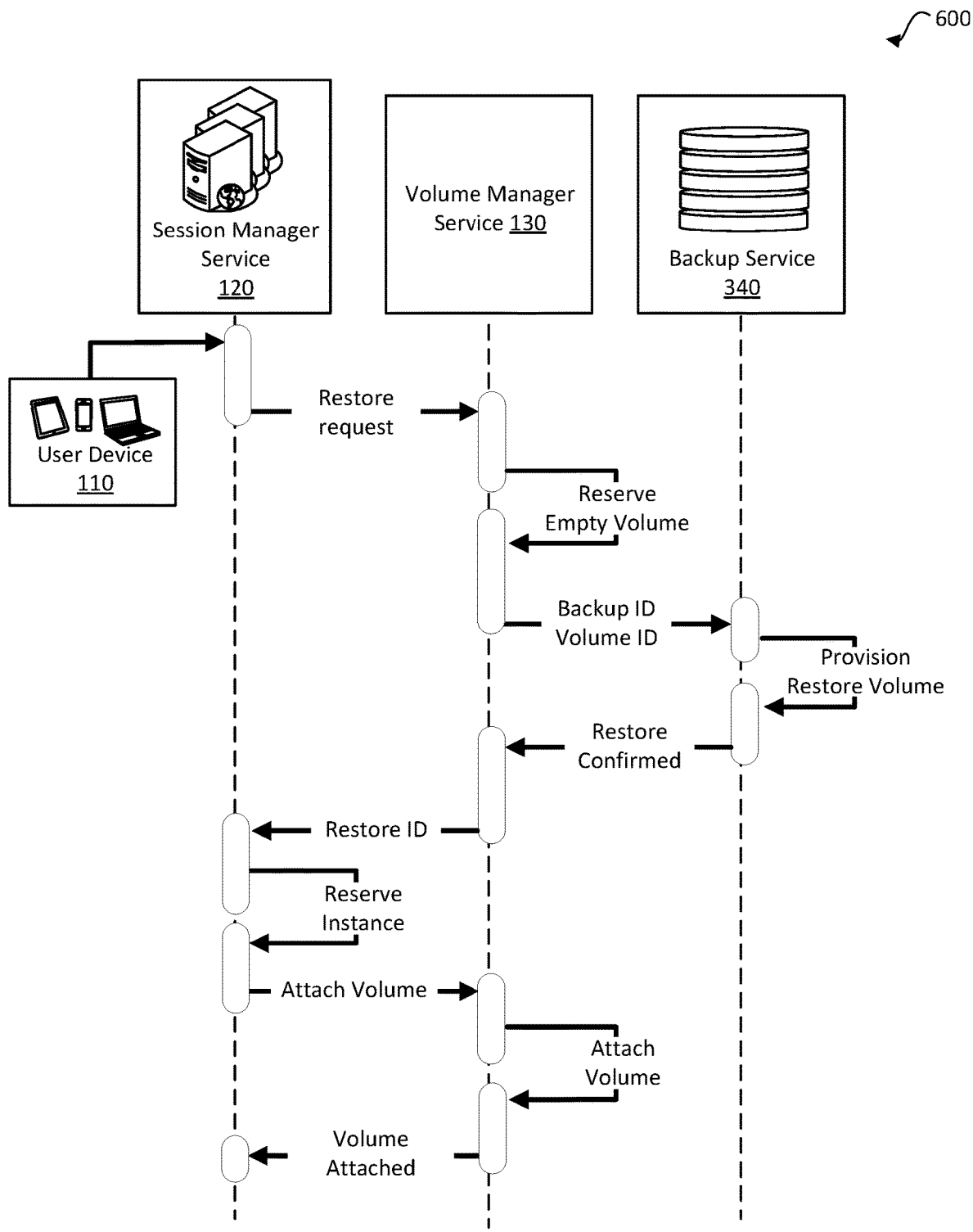
FIG. 6 illustrates a sequence diagram showing an example data flow by which user data is persisted to a restored secure shell instance, in accordance with one or more embodiments.

FIG. 6 illustrates a sequence diagram showing an example data flow 600 by which user data is persisted to a restored secure shell instance, in accordance with one or more embodiments. A user of the user device 110 requests to connect and/or reconnect to a secure shell instance and the session manager service 120 may request the volume manager service 130 to restore the user volume. The volume manager service 130 may coordinate with the backup service 340 to provision the restore volume.

In data flow 600, the session manager service 120 may receive a connection request from the user device 110. When the user device 110 previously has been connected to a secure shell instance, and the data from that instance has been stored in a backup, as described in more detail in reference to FIG. 3, the session manager service 120 may send a restore request to the volume manager service 130. The restore request may include identifying information describing the user of the user device 110 and/or the backup user data (e.g., user identifier, username, last session identifier, backup identifier, etc.).

The volume manager service 130 may reserve an empty block volume (e.g., empty block volume 240 of FIG. 2) instead of searching for an existing user block volume (e.g., user block volume 230 of FIG. 2). As opposed to the operations described in reference to FIG. 2, the volume manager service 130 may provide a backup identifier to the backup service 340, as part of a provisioning process to restore user backup data (e.g., user backup data 430 of FIG. 4).

Provisioning the restore volume may include transferring backup data from the backup storage system to the empty block volume by the backup service 340. This may include restoring the structure of the data to reproduce the user block volume. The volume manager service 130 may provide the data center identifier of the empty block volume to the backup service 340, which may provision the empty volume with the backup data. In some embodiments, the volume manager service 130 may perform the provisioning operations by providing the backup data identifier to the backup service 340, receiving the corresponding user backup data, and restoring the data to the reserved block volume.

Once provisioned, the volume manager service 130 may provide the restore volume identifier to the session manager service 120, which may correspond to the data center identifier of the empty block volume. Using this identifier, the session manager service 120 may perform the operations as described in more detail in reference to FIG. 2, including, but not limited to reserving an instance from a pool of pre-configured instances and requesting the volume manager service 130 to attach the restore volume to the reserved instance. The volume manager service 130 may, in some cases, confirm attachment of the restore volume by returning a confirmation to the session manager service 120.

Figure 7:
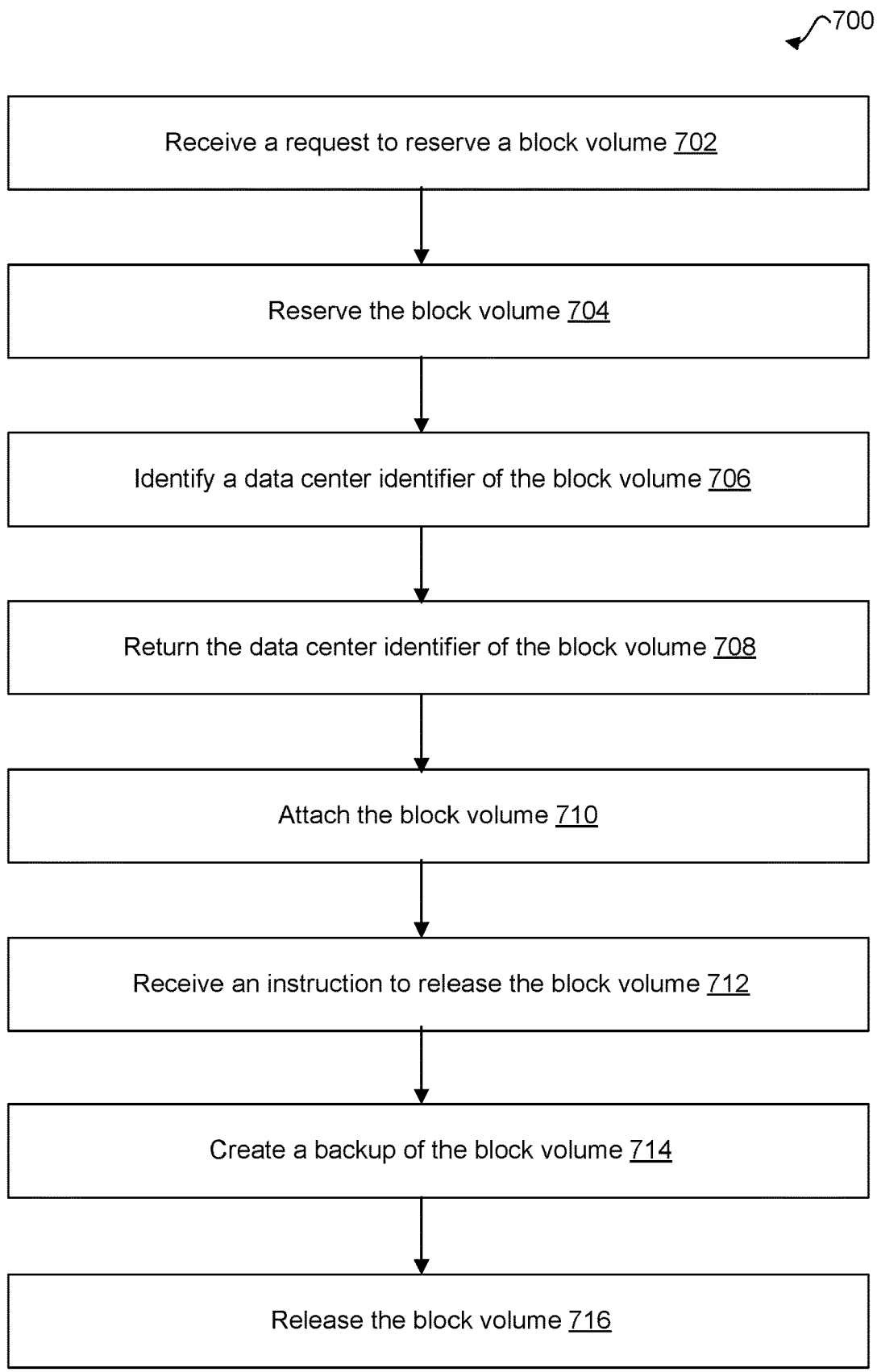
FIG. 7 illustrates an example flow for releasing a block volume for a secure shell instance, in accordance with one or more embodiments.

FIG. 7 illustrates an example flow for releasing a block volume for a secure shell instance, in accordance with one or more embodiments. The operations of the flow can be implemented as hardware circuitry and/or stored as computer-readable instructions on a non-transitory computer-readable medium of a computer system, such as the volume manager service 130 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 700 includes an operation 702, where the computer system receives a request to reserve a block volume. As described in more detail in reference to FIG. 2, the request may be generated by a session manager service (e.g., session manager service 120 of FIG. 1) in response to a request from a user device (e.g., user device 110 of FIG. 1) to connect to a secure shell instance (e.g., secure shell instance 250 of FIG. 2). The request may include a user identifier associated with the user device 110 (e.g., a username, login ID, session ID, network address, etc.).

In an example, the flow 700 includes an operation 704, where the computer system reserves the block volume. Reserving the block volume may include ascertaining, by the volume manager service, whether a user block volume (e.g., user block volume 230 of FIG. 2) is being maintained by a block volume storage system of the IaaS system to which the volume manager service is connected, as described in more detail in reference to FIG. 8, below. Otherwise, the volume manager service may reserve an empty block volume (e.g., empty block volume 240 of FIG. 2).

In an example, the flow 700 includes an operation 706, where the computer system identifies a data center identifier of the block volume. The data center identifier may describe the IaaS storage resource (e.g., networked storage infrastructure) that maintains the block volume (e.g., block volumes 140 of FIG. 1), and may be unique to a single data center of the IaaS system (e.g., an installation in a particular geographic region).

In an example, the flow 700 includes an operation 708, where the computer system returns the data center identifier of the block volume. The volume manager system may provide the data center identifier of the reserved block volume identified as part of operation 708 to the session manager service. The session manager service may, in turn, provide the data center identifier of the reserved block volume to an instance manager service (e.g., instance manager service 150 of FIG. 1) as part of configuring the secure shell instance, as described in more detail in reference to FIGS. 1-2.

In an example, the flow 700 includes an operation 710, where the computer system attaches the block volume. The volume manager service may attach the reserved block volume to an instance allocated from a pool of partially pre-configured instances (e.g., instances 180 of FIG. 1), selected by the instance manager service for use in creating the secure shell instance.

In an example, the flow 700 includes an operation 712, where the computer system receives an instruction to release the block volume. The volume manager service may receive the request from the session manager service, as described in more detail in reference to FIG. 3, after the session manager service has ascertained an idle time for the secure shell instance that exceeds a lifetime of the secure shell instance. In some embodiments, the user of the user device may also request to terminate the secure shell instance. The session manager service may request the volume manager service to release the reserved block volume as one of multiple operations associated with terminating the secure shell instance, for example, disconnecting the secure shell instance (e.g., as a docker container) from a docker, deleting the instance, and de-associating compute resources from the block volume, to potentially protect core IaaS resources and user data.

In some embodiments, a retention time may follow secure shell termination during which user block volume data may be maintained and/or retained. Retention of user block volume data may reduce latency associated with initializing a new secure shell instance, for example, by attaching user block volume data to the new secure shell instance without restoring user data from a backup, such as object storage. In some embodiments, the retention time may include a number of hours or a number of days, for example, 12 hours, 24 hours, 36 hours, 48 hours, 72 hours, etc. In some embodiments, the retention time may be calculated from the end of the idle time, such that a secure shell instance timeout may trigger the termination of the instance, but a user block volume may be retained after idle timeout until the retention period (e.g., 72 hours) has elapsed.

In an example, the flow 700 includes an operation 714, where the computer system creates a backup of the block volume. The volume manager service may request a backup to be made as part of releasing the block volume. The backup, as described in more detail in reference to FIG. 3, may be created in different formats including, but not limited to, block storage, object storage, and/or as a volume image. The backup data (e.g., user backup data 430 of FIG. 4) may be created by a backup service (e.g., backup service 340 of FIG. 3), which may be a IaaS core service with which the volume manager service communicates.

In an example, the flow 700 includes an operation 716, where the computer system releases the block volume. The volume manager service may release the block volume at least in part by reformatting the volume (e.g., clearing the data stored in the block volume) and de-associating the storage resources previously identified with the block volume to be available for other uses. In contrast to maintaining a user block volume, as during the retention time after terminating a secure shell instance, releasing the block volume may permit the IaaS systems described herein to operate with reduced computational overhead, by potentially reducing the resources dedicated to maintaining user block volumes during periods of time in which a user is not connected to a secure shell instance.

Figure 8:
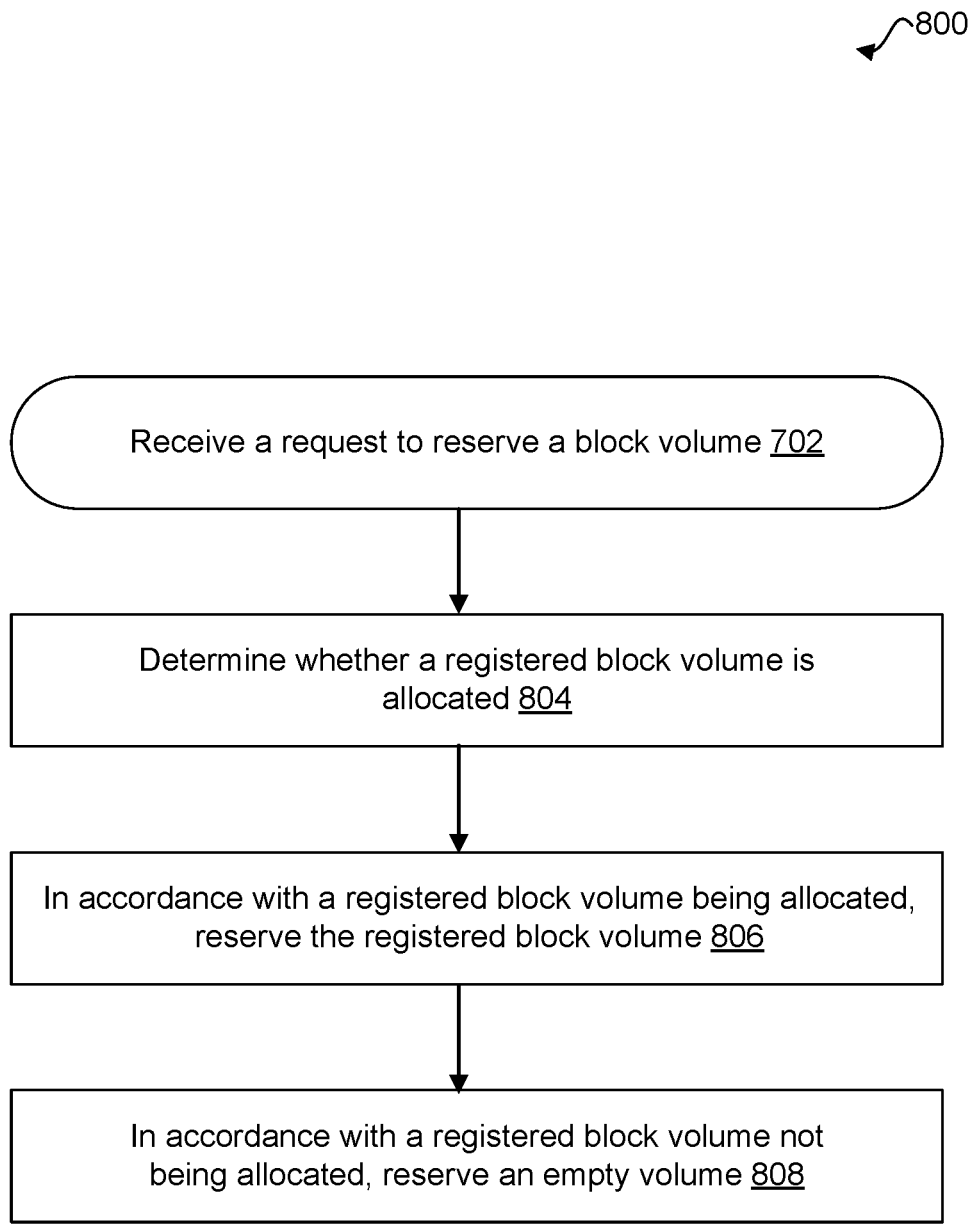
FIG. 8 illustrates an example flow for reserving a block volume for a secure shell instance, in accordance with one or more embodiments.

FIG. 8 illustrates an example flow for reserving a block volume for a secure shell instance, in accordance with one or more embodiments. The operations of the flow can be implemented as hardware circuitry and/or stored as computer-readable instructions on a non-transitory computer-readable medium of a computer system, such as the volume manager service 130 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 800 includes one or more operations that may be performed by the volume manager service in response to receiving a request to reserve a block volume (e.g., operation 702 of FIG. 7). As such, the flow 800 includes the operation 702, whereby the volume manager service receives the request to reserve the block volume from a session manager service (e.g., session manager service 120 of FIG. 1).

In an example, the flow 800 includes an operation 804, where the computer system determines whether a registered block volume is allocated. The registered block volume may be a block volume associated with the user of the user device (e.g., user device 110 of FIG. 1). As such, the operation 804 may include ascertaining, by the volume manager service, whether a user block volume (e.g., user block volume 230 of FIG. 2) is being maintained by a block volume storage system of the IaaS system to which the volume manager service is connected.

In an example, the flow 800 includes an operation 806, where the computer system, in accordance with a registered block volume being allocated, reserves the registered block volume. In cases where the operation 804 returns a data center identifier of a user block volume, the volume manager service may reserve the user block volume for attachment to the secure shell instance.

In an example, the flow 800 includes an operation 808, where the computer system, in accordance with a registered block volume not being allocated, reserves an empty volume. In contrast to operation 806, when a user block volume is unavailable, the volume manager service may reserve an empty block volume (e.g., empty block volume 240 of FIG. 2). The empty block volume may be at least partially pre-configured with one or more settings and/or configuration parameters for attachment to a secure compute instance.

Figure 9:
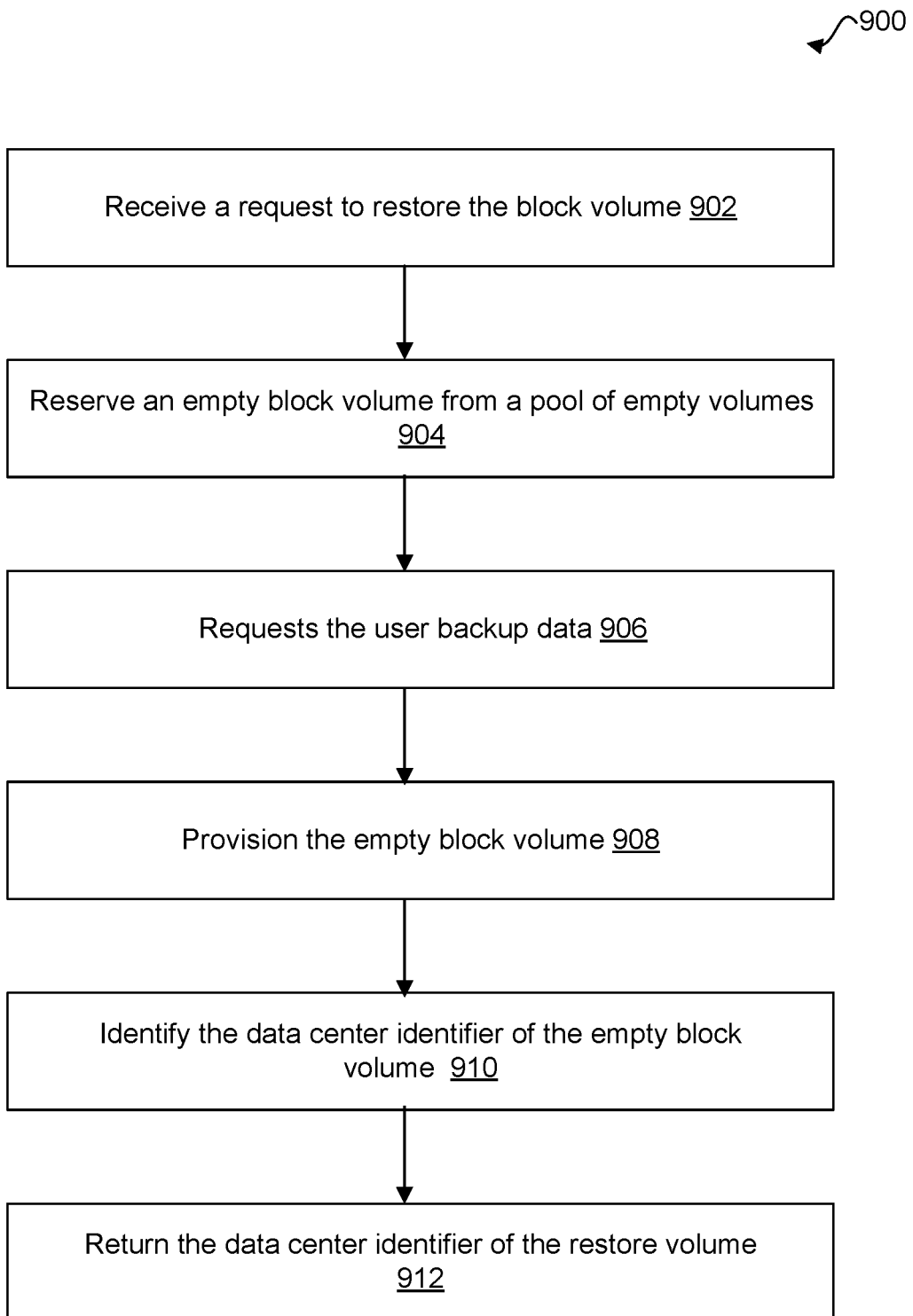
FIG. 9 illustrates an example flow for restoring a block volume for a secure shell instance, in accordance with one or more embodiments.

FIG. 9 illustrates an example flow 900 for restoring a block volume for a secure shell instance, in accordance with one or more embodiments. The operations of the flow can be implemented as hardware circuitry and/or stored as computer-readable instructions on a non-transitory computer-readable medium of a computer system, such as the volume manager service 130 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 900 includes an operation 902, where the computer system receives a request to restore the block volume. As described in more detail in reference to FIG. 4, the volume manager service may receive the request to restore the block volume from a session manager service (e.g., session manager service 120 of FIG. 1), after the user of a user device (e.g., user device 110 of FIG. 1) requests to reconnect to a secure shell instance (e.g., secure shell instance 250 of FIG. 2). In some embodiments, the request may include a user identifier, by which the volume manager service may implement one or more backup restoration operations, described below.

In an example, the flow 900 includes an operation 904, where the computer system reserves an empty block volume from a pool of empty volumes. In contrast to the operations described in reference to flow 800 of FIG. 8, the volume manager service may implement the restore request of the operation 902 at least in part by reserving an empty block volume (e.g., empty block volume 240 of FIG. 2), without ascertaining whether a user block volume is being maintained by an IaaS data storage system. For example, when a backup has been created, as described in more detail in reference to FIG. 7, the volume manager service may reserve an empty block volume without performing the operations described in reference to FIG. 8.

Alternatively, the volume manager system may implement the operations described in reference to FIG. 8, by ascertaining whether a user block volume is being maintained by the IaaS data storage system. In this way, the volume manager service may return the user block volume data center identifier rather than reserving an empty block volume.

In an example, the flow 900 includes an operation 906, where the computer system requests the user backup data. The volume manager service may request the user data backup (e.g., user data backup 430 of FIG. 4) to be transferred to the reserved empty block volume of the operation 904. The request may be made of a backup service (e.g., backup service 340 of FIG. 3), which may be a core IaaS service that facilitates data backup and restore operations.

In an example, the flow 900 includes an operation 908, where the computer system provisions the empty block volume. As described in more detail in reference to FIG. 4, provisioning the empty block volume may include operations to recreate the structure of the user block volume (e.g., user block volume 230 of FIG. 2) preceding the backup operation (e.g., operation 714 of FIG. 7).

In an example, the flow 900 includes an operation 910, where the computer system, identifies the data center identifier of the empty block volume. The volume manager service may identify the data center identifier of the empty block volume as the data center identifier of the restore volume, such that the restore volume may be attached to the secure shell instance. The data center identifier may be a unique identifier corresponding to the data center (e.g., IaaS infrastructure) where the empty block volume is maintained.

In an example, the flow 900 includes an operation 912, where the computer system, returns the data center identifier of the restore volume. The data center identifier may be returned by the volume manager service to the session manager service, for configuration of the secure shell instance as described in more detail in reference to FIGS. 1-2, above.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
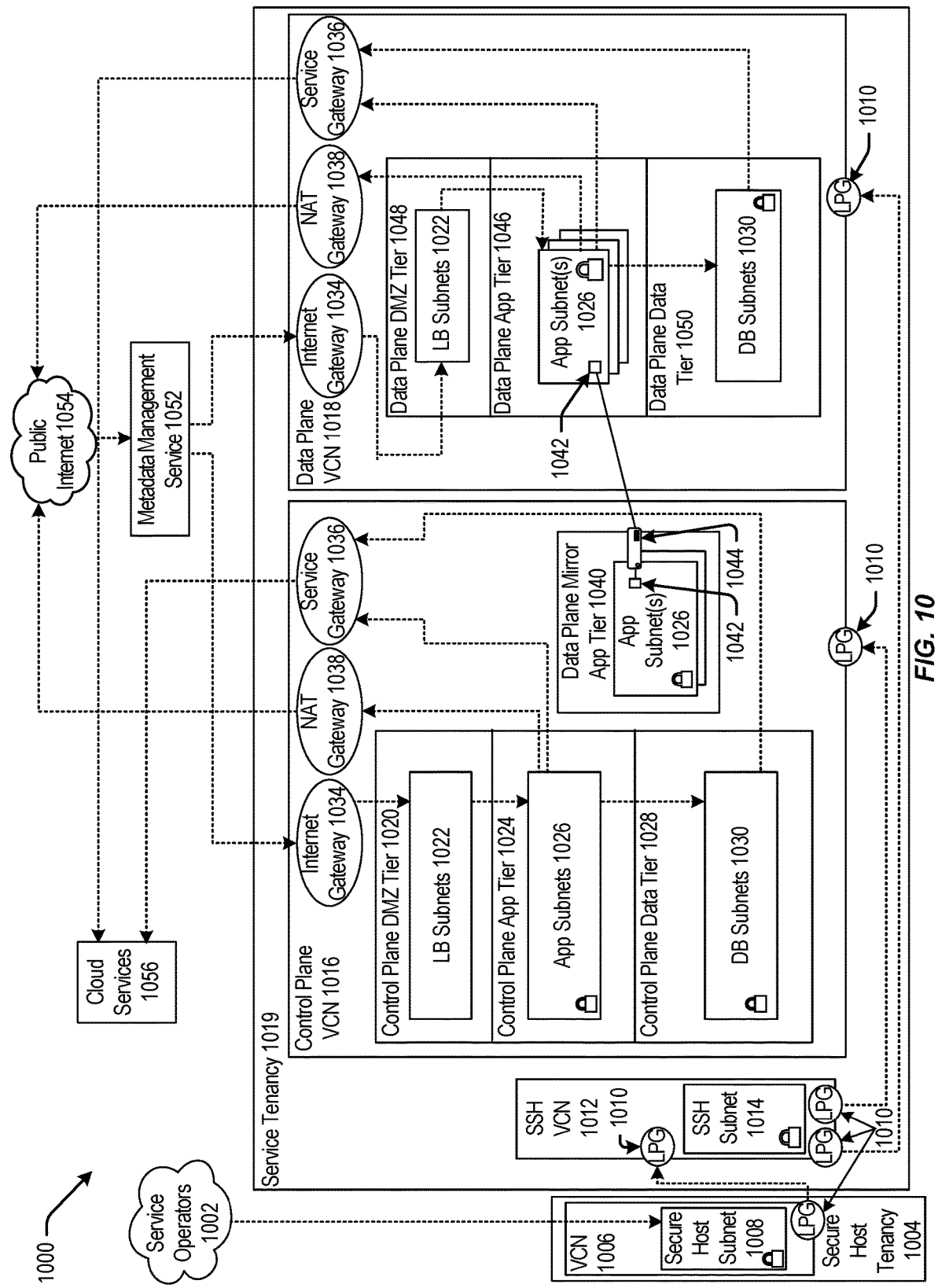
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep security breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plan VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Memory that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of security, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
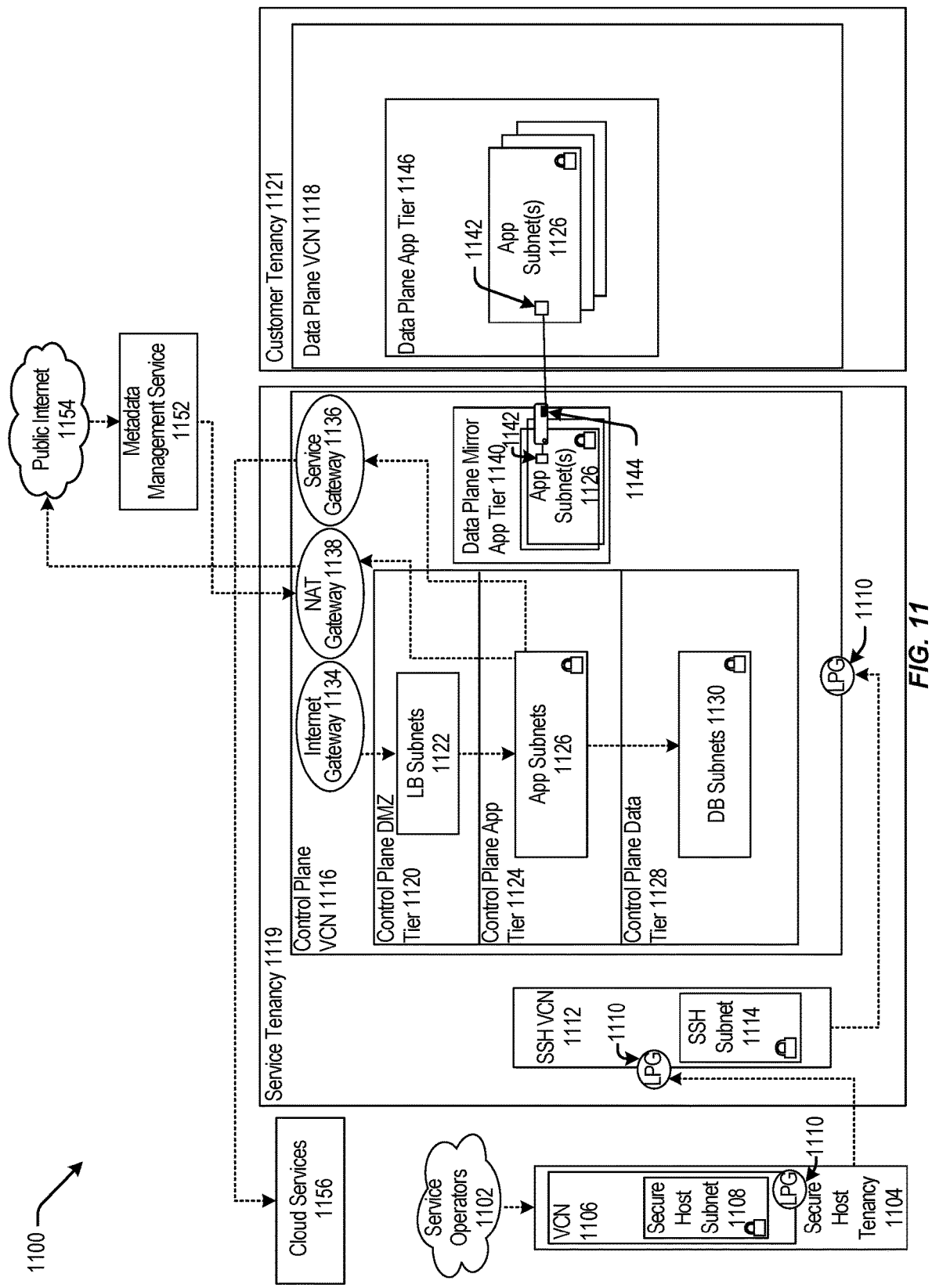
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 1002 of FIG. 10) can be communicatively coupled to a secure host tenancy 1104 (e.g. the secure host tenancy 1004 of FIG. 10) that can include a virtual cloud network (VCN) 1106 (e.g. the VCN 1006 of FIG. 10) and a secure host subnet 1108 (e.g. the secure host subnet 1008 of FIG. 10). The VCN 1106 can include a local peering gateway (LPG) 1110 (e.g. the LPG 1010 of FIG. 10) that can be communicatively coupled to a secure shell (SSH) VCN 1112 (e.g. the SSH VCN 1012 of FIG. 10) via an LPG 1010 contained in the SSH VCN 1112. The SSH VCN 1112 can include an SSH subnet 1114 (e.g. the SSH subnet 1014 of FIG. 10), and the SSH VCN 1112 can be communicatively coupled to a control plane VCN 1116 (e.g. the control plane VCN 1016 of FIG. 10) via an LPG 1110 contained in the control plane VCN 1116. The control plane VCN 1116 can be contained in a service tenancy 1119 (e.g. the service tenancy 1019 of FIG. 10), and the data plane VCN 1118 (e.g. the data plane VCN 1018 of FIG. 10) can be contained in a customer tenancy 1121 that may be owned or operated by users, or customers, of the system.

The control plane VCN 1116 can include a control plane DMZ tier 1120 (e.g. the control plane DMZ tier 1020 of FIG. 10) that can include LB subnet(s) 1122 (e.g. LB subnet(s) 1022 of FIG. 10), a control plane app tier 1124 (e.g. the control plane app tier 1024 of FIG. 10) that can include app subnet(s) 1126 (e.g. app subnet(s) 1026 of FIG. 10), a control plane data tier 1128 (e.g. the control plane data tier 1028 of FIG. 10) that can include database (DB) subnet(s) 1130 (e.g. similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g. the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g. the service gateway of FIG. 10) and a network address translation (NAT) gateway 1138 (e.g. the NAT gateway 1038 of FIG. 10). The control plane VCN 1116 can include the service gateway 1136 and the NAT gateway 1138.

The control plane VCN 1116 can include a data plane mirror app tier 1140 (e.g. the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g. the VNIC of 1042) that can execute a compute instance 1144 (e.g. similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g. the data plane app tier 1046 of FIG. 10) via the VNIC 1142 contained in the data plane mirror app tier 1140 and the VNIC 1142 contained in the data plan app tier 1146.

The Internet gateway 1134 contained in the control plane VCN 1116 can be communicatively coupled to a metadata management service 1152 (e.g. the metadata management service 1052 of FIG. 10) that can be communicatively coupled to public Internet 1154 (e.g. public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g. cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
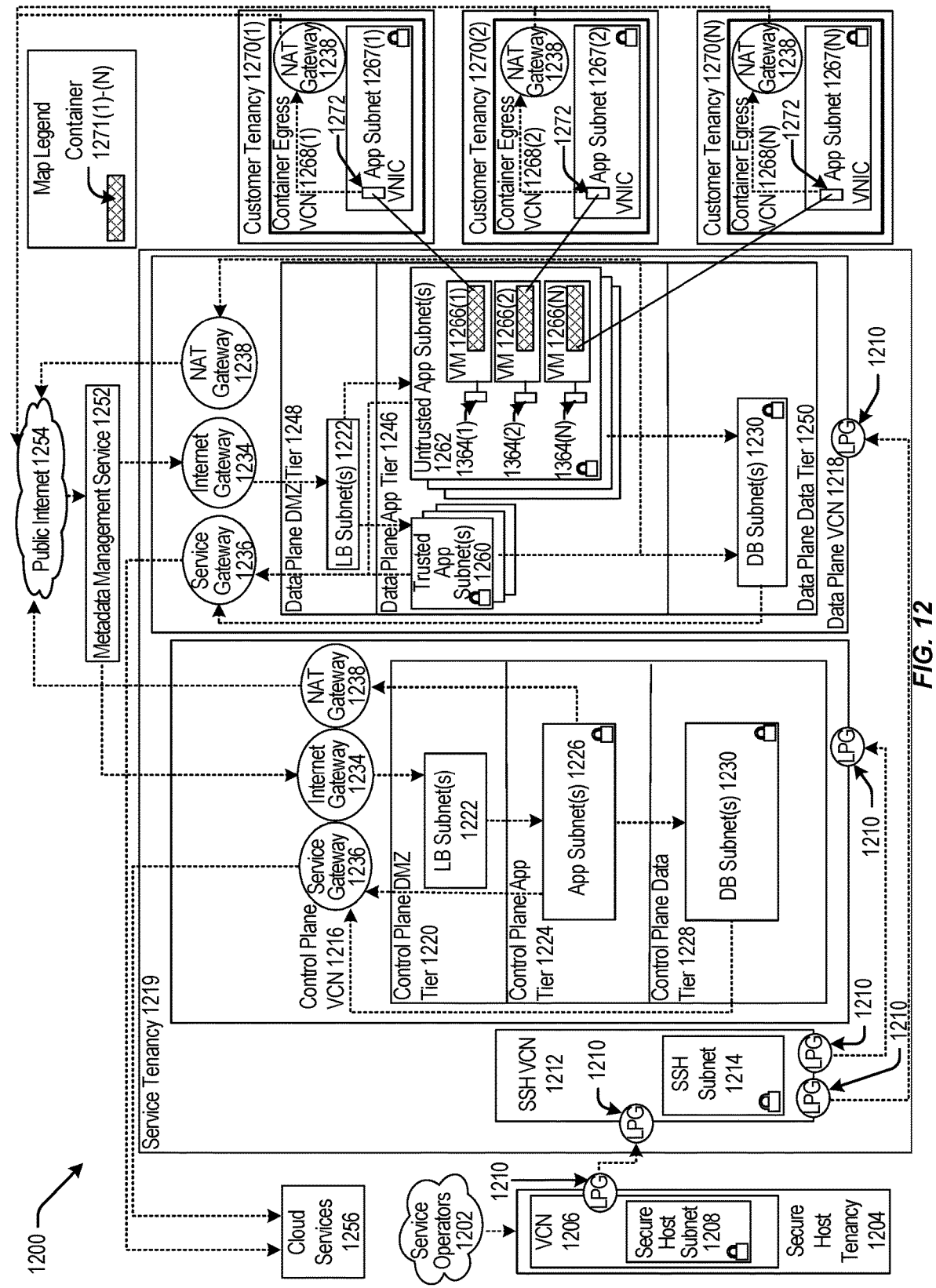
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1002 of FIG. 10) can be communicatively coupled to a secure host tenancy 1204 (e.g. the secure host tenancy 1004 of FIG. 10) that can include a virtual cloud network (VCN) 1206 (e.g. the VCN 1006 of FIG. 10) and a secure host subnet 1208 (e.g. the secure host subnet 1008 of FIG. 10). The VCN 1206 can include an LPG 1210 (e.g. the LPG 1010 of FIG. 10) that can be communicatively coupled to an SSH VCN 1212 (e.g. the SSH VCN 1012 of FIG. 10) via an LPG 1210 contained in the SSH VCN 1212. The SSH VCN 1212 can include an SSH subnet 1214 (e.g. the SSH subnet 1014 of FIG. 10), and the SSH VCN 1212 can be communicatively coupled to a control plane VCN 1216 (e.g. the control plane VCN 1016 of FIG. 10) via an LPG 1210 contained in the control plane VCN 1216 and to a data plane VCN 1218 (e.g. the data plane 1018 of FIG. 10) via an LPG 1210 contained in the data plane VCN 1218. The control plane VCN 1216 and the data plane VCN 1218 can be contained in a service tenancy 1219 (e.g. the service tenancy 1019 of FIG. 10).

The control plane VCN 1216 can include a control plane DMZ tier 1220 (e.g. the control plane DMZ tier 1020 of FIG. 10) that can include load balancer (LB) subnet(s) 1222 (e.g. LB subnet(s) 1022 of FIG. 10), a control plane app tier 1224 (e.g. the control plane app tier 1024 of FIG. 10) that can include app subnet(s) 1226 (e.g. similar to app subnet(s) 1026 of FIG. 10), a control plane data tier 1228 (e.g. the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 10) and a network address translation (NAT) gateway 1238 (e.g. the NAT gateway 1038 of FIG. 10). The control plane VCN 1216 can include the service gateway 1236 and the NAT gateway 1238.

The data plane VCN 1218 can include a data plane app tier 1246 (e.g. the data plane app tier 1046 of FIG. 10), a data plane DMZ tier 1248 (e.g. the data plane DMZ tier 1048 of FIG. 10), and a data plane data tier 1250 (e.g. the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g. public Internet 1054 of FIG. 10).

The Internet gateway 1234 contained in the control plane VCN 1216 and contained in the data plane VCN 1218 can be communicatively coupled to a metadata management service 1252 (e.g. the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
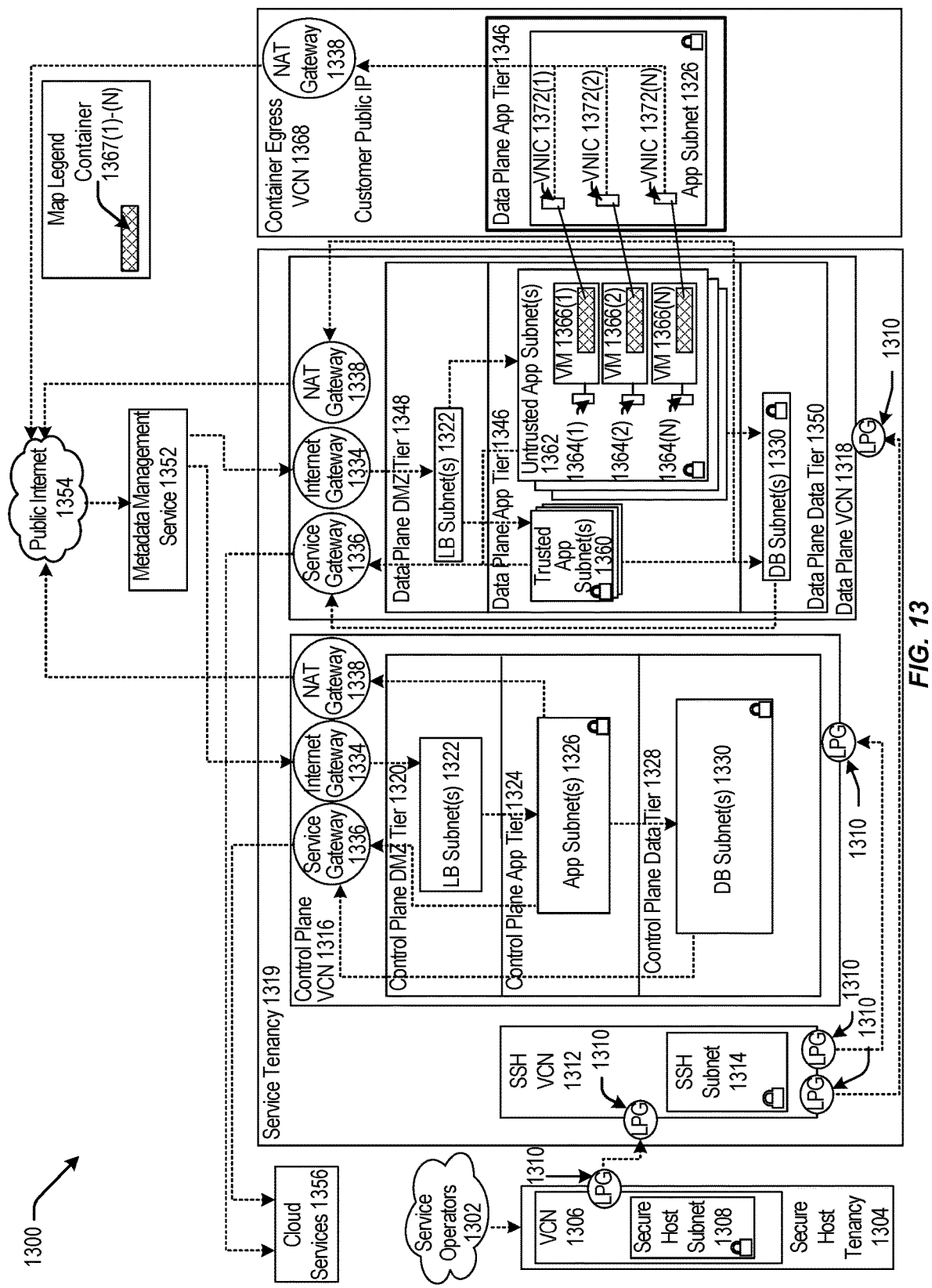
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1002 of FIG. 10) can be communicatively coupled to a secure host tenancy 1304 (e.g. the secure host tenancy 1004 of FIG. 10) that can include a virtual cloud network (VCN) 1306 (e.g. the VCN 1006 of FIG. 10) and a secure host subnet 1308 (e.g. the secure host subnet 1008 of FIG. 10). The VCN 1306 can include an LPG 1310 (e.g. the LPG 1010 of FIG. 10) that can be communicatively coupled to an SSH VCN 1312 (e.g. the SSH VCN 1012 of FIG. 10) via an LPG 1310 contained in the SSH VCN 1312. The SSH VCN 1312 can include an SSH subnet 1314 (e.g. the SSH subnet 1014 of FIG. 10), and the SSH VCN 1312 can be communicatively coupled to a control plane VCN 1316 (e.g. the control plane VCN 1016 of FIG. 10) via an LPG 1310 contained in the control plane VCN 1316 and to a data plane VCN 1318 (e.g. the data plane 1018 of FIG. 10) via an LPG 1310 contained in the data plane VCN 1318. The control plane VCN 1316 and the data plane VCN 1318 can be contained in a service tenancy 1319 (e.g. the service tenancy 1019 of FIG. 10).

The control plane VCN 1316 can include a control plane DMZ tier 1320 (e.g. the control plane DMZ tier 1020 of FIG. 10) that can include LB subnet(s) 1322 (e.g. LB subnet(s) 1022 of FIG. 10), a control plane app tier 1324 (e.g. the control plane app tier 1024 of FIG. 10) that can include app subnet(s) 1326 (e.g. app subnet(s) 1026 of FIG. 10), a control plane data tier 1328 (e.g. the control plane data tier 1028 of FIG. 10) that can include DB subnet(s) 1330 (e.g. DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 10) and a network address translation (NAT) gateway 1338 (e.g. the NAT gateway 1038 of FIG. 10). The control plane VCN 1316 can include the service gateway 1336 and the NAT gateway 1338.

The data plane VCN 1318 can include a data plane app tier 1346 (e.g. the data plane app tier 1046 of FIG. 10), a data plane DMZ tier 1348 (e.g. the data plane DMZ tier 1048 of FIG. 10), and a data plane data tier 1350 (e.g. the data plane data tier 1050 of FIG. 10). The data plane DMZ tier 1348 can include LB subnet(s) 1322 that can be communicatively coupled to trusted app subnet(s) 1360 (e.g. trusted app subnet(s) 1260 of FIG. 12) and untrusted app subnet(s) 1362 (e.g. untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g. public Internet 1054 of FIG. 10).

The Internet gateway 1334 contained in the control plane VCN 1316 and contained in the data plane VCN 1318 can be communicatively coupled to a metadata management service 1352 (e.g. the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
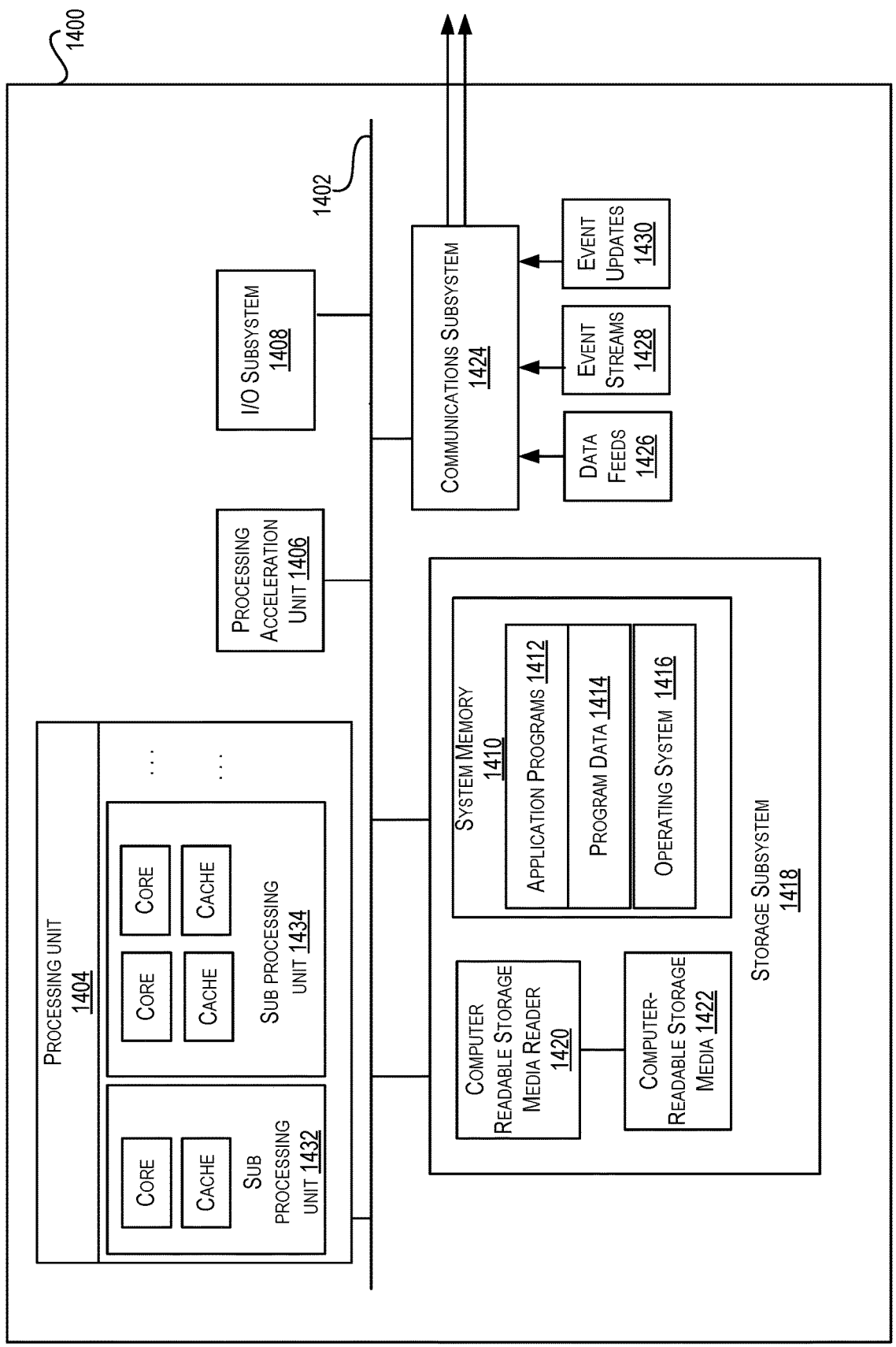
FIG. 14 is a block diagram illustrating an example computer system, according to at least one embodiment.

FIG. 14 illustrates an example computer system 1400, in which various embodiments of the present disclosure may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 14 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   transmitting, by a first computing device, a first request to reserve a block volume;
   receiving, by the first computing device, a data center identifier for a block volume reserved by a second computing device;
   reserving, by the first computing device, a virtual compute instance;
   transmitting, by the first computing device, a second request to attach the block volume;
   receiving, by the first computing device, information that identifies that the block volume was attached;
   transmitting, by the first computing device, an instruction to release the block volume;
   receiving, by the first computing device, confirmation from a second device that the block volume was released.

2. The method of claim 1, wherein the first computing device is part of a session manager service, and wherein the second computing device is part of a volume manager service.

3. The method of claim 2, wherein the first request and the second request are transmitted to the volume manager service.

4. The method of claim 2, wherein the first request comprises a user identifier, and wherein the volume manager service is configured to reserve the block volume by:
   determining whether a registered block volume is allocated to a user corresponding to the user identifier;
   in accordance with a registered block volume being allocated to the user, reserving the registered block volume; and
   in accordance with a registered block volume not being allocated to a user corresponding to the user identifier, reserving an empty volume from a pool of empty volumes, the empty volume being preformatted to dock with a secure cloud shell.

5. The method of claim 1, further comprising:
   transmitting, by the first computing device, a third request to restore the block volume to create a restore volume; and
   receiving, by the first computing device, a data center identifier of the restore volume.

6. The method of claim 5, wherein the backup of the block volume further comprises an identifier of the backup, and wherein creating the restore volume comprises:
   reserving an empty block volume from a pool of empty volumes, the empty block volume being preformatted to dock with a secure cloud shell;
   retrieving the backup of the block volume using the identifier of the backup;
   provisioning the empty block volume at least in part by loading the backup of the block volume onto the empty block volume; and
   identifying the data center identifier of the empty block volume as the data center identifier of the restore volume.

7. The method of claim 1, further comprising retaining the block volume during a retention period.

8. The method of claim 1, wherein the confirmation further includes information that the block volume was backed up by the second computing device.

9. A first computing device, comprising:
   a memory configured to store computer-executable instructions; and
   a processor configured to access the memory and execute the computer-executable instructions to at least:
      transmit a first request to reserve a block volume;
      receive a data center identifier for a block volume reserved by a second computing device;
      reserve a virtual compute instance;
      transmit a second request to attach the block volume;
      receive information that identifies that the block volume was attached;
      transmit an instruction to release the block volume; and
      receive confirmation from a second device that the block volume was released.

10. The first computing device of claim 9, wherein the first computing device is part of a session manager service, and wherein the second computing device is part of a volume manager service.

11. The first computing device of claim 10, wherein the first request and the second request are transmitted to the volume manager service.

12. The first computing device of claim 10, wherein the first request comprises a user identifier, and wherein the volume manager service is configured to reserve the block volume by:

determining whether a registered block volume is allocated to a user corresponding to the user identifier;
in accordance with a registered block volume being allocated to the user, reserving the registered block volume; and
in accordance with a registered block volume not being allocated to a user corresponding to the user identifier, reserving an empty volume from a pool of empty volumes, the empty volume being preformatted to dock with a secure cloud shell.

13. The first computing device of claim 9, where the processor is further configured to execute the computer-executable instructions to at least:
transmit a third request to restore the block volume to create a restore volume; and
receive a data center identifier of the restore volume.

14. The first computing device of claim 13, wherein the backup of the block volume further comprises an identifier of the backup, and wherein creating the restore volume comprises:
reserving an empty block volume from a pool of empty volumes, the empty block volume being preformatted to dock with a secure cloud shell;
retrieving the backup of the block volume using the identifier of the backup;
provisioning the empty block volume at least in part by loading the backup of the block volume onto the empty block volume; and
identifying the data center identifier of the empty block volume as the data center identifier of the restore volume.

15. A non-transitory computer-readable storage medium, storing computer-executable instructions that, when executed, cause one or more processors of a first computing device to perform operations comprising:
transmitting a first request to reserve a block volume;
receiving a data center identifier for a block volume reserved by a second computing device;
reserving a virtual compute instance;
transmitting a second request to attach the block volume;
receiving, by the first computing device, information that identifies that the block volume was attached;
transmitting an instruction to release the block volume;
receiving confirmation from a second device that the block volume was released.

16. The non-transitory computer-readable storage medium of claim 15, wherein the first request comprises a user identifier, and wherein the volume manager service is configured to reserve the block volume by:
determining whether a registered block volume is allocated to a user corresponding to the user identifier;
in accordance with a registered block volume being allocated to the user, reserving the registered block volume; and
in accordance with a registered block volume not being allocated to a user corresponding to the user identifier, reserving an empty volume from a pool of empty volumes, the empty volume being preformatted to dock with a secure cloud shell.

17. The non-transitory computer-readable storage medium of claim 15, wherein the operations further comprise:
transmitting a third request to restore the block volume to create a restore volume; and
receiving a data center identifier of the restore volume.

18. The non-transitory computer-readable storage medium of claim 17, wherein the backup of the block volume further comprises an identifier of the backup, and wherein creating the restore volume comprises:
reserving an empty block volume from a pool of empty volumes, the empty block volume being preformatted to dock with a secure cloud shell;
retrieving the backup of the block volume using the identifier of the backup;
provisioning the empty block volume at least in part by loading the backup of the block volume onto the empty block volume; and
identifying the data center identifier of the empty block volume as the data center identifier of the restore volume.

19. The non-transitory computer-readable storage medium of claim 15, wherein the operations further comprise retaining the block volume during a retention period.

20. The non-transitory computer-readable storage medium of claim 15, wherein the confirmation further includes information that the block volume was backed up by the second computing device.

* * * * *